(12) United States Patent
Roberts, Jr.

(10) Patent No.: US 8,840,819 B2
(45) Date of Patent: *Sep. 23, 2014

(54) IN-SITU FOAM CORE STRUCTURAL ENERGY MANAGEMENT SYSTEM AND METHOD OF MANUFACTURE

(76) Inventor: Richard W. Roberts, Jr., Tecumseh, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/463,700

(22) Filed: May 3, 2012

(65) Prior Publication Data

US 2013/0257069 A1    Oct. 3, 2013

Related U.S. Application Data

(60) Provisional application No. 61/616,948, filed on Mar. 28, 2012.

(51) Int. Cl.
*B29C 44/08* (2006.01)
*B29C 44/12* (2006.01)
*B60R 19/18* (2006.01)
*B29C 49/00* (2006.01)
*B60R 19/22* (2006.01)
*B29C 44/00* (2006.01)

(52) U.S. Cl.
CPC ............... *B60R 19/22* (2013.01); *B60R 19/18* (2013.01); *B29C 49/00* (2013.01); *B29C 44/086* (2013.01); *B29C 67/222* (2013.01); *B60R 2019/1873* (2013.01)
USPC ....... 264/45.4; 264/45.2; 264/45.5; 264/46.4; 264/46.6; 264/155; 264/255; 293/109; 293/110

(58) Field of Classification Search
CPC .............................. B29C 67/222; B29C 44/086
USPC .......................... 264/45.2, 45.4; 293/109, 110
See application file for complete search history.

(56) References Cited

U.S. PATENT DOCUMENTS 776,342 A    11/1904   McCormick
1,588,778 A   6/1926   Sorensen
(Continued)

FOREIGN PATENT DOCUMENTS

EP    0542302    5/1993
JP    58213028   12/1983
(Continued)

OTHER PUBLICATIONS

Website www.jsp.com, 2006, "Arplank, Expanded bead foam packaging materials, Material Properties, Auto/Mil Specs." 21 Pages.

(Continued)

*Primary Examiner* — Christina Johnson
*Assistant Examiner* — David Schmerfeld
(74) *Attorney, Agent, or Firm* — Brooks Kushman P.C.

(57) ABSTRACT

An energy management system for use with a vehicle having an interior includes an elongated plastic member having a wall defining a cavity. Disposed within the cavity is an elongated first in-situ foam core member, which has a first thermal bond to the wall. The wall having a first portion facing towards the vehicle interior and a second portion opposed to the first portion. A second in-situ foam core member is connected to at least a portion of the elongated plastic member forming the energy management system. The energy management system is capable of passing a 5-mph crash test passing Federal Motor Vehicle Safety Standard 215 (FMVSS 215) Phase II.

6 Claims, 4 Drawing Sheets

(56) References Cited

U.S. PATENT DOCUMENTS

| | | | |
|---|---|---|---|
| 2,983,963 A | 5/1961 | Jodell et al. |
| 3,062,337 A | 11/1962 | Zittle |
| 3,111,787 A | 11/1963 | Chamberlain |
| 3,132,417 A | 5/1964 | Irwin |
| 3,277,220 A | 10/1966 | Plymale et al. |
| 3,389,195 A | 6/1968 | Gianakos et al. |
| 3,400,429 A | 9/1968 | Ludwig |
| 3,466,700 A | 9/1969 | Harrison |
| 3,468,097 A | 9/1969 | Mack |
| 3,563,845 A | 2/1971 | Stevens |
| 3,598,312 A | 8/1971 | Hamilton |
| 3,745,998 A | 7/1973 | Rose |
| 3,813,040 A | 5/1974 | Heinemeyer |
| 3,935,044 A | 1/1976 | Daly |
| 4,361,656 A | 11/1982 | Mostafa |
| 4,492,663 A | 1/1985 | Reinfeld et al. |
| 4,546,899 A | 10/1985 | Williams |
| 4,651,494 A | 3/1987 | Van Wagoner |
| 4,680,909 A | 7/1987 | Stewart |
| 4,825,089 A | 4/1989 | Lindsay |
| 4,840,973 A | 6/1989 | Kuwabara et al. |
| 5,018,329 A | 5/1991 | Hasan et al. |
| 5,028,377 A | 7/1991 | Hendry |
| 5,055,350 A | 10/1991 | Neefe |
| 5,093,053 A | 3/1992 | Eckardt et al. |
| 5,252,270 A | 10/1993 | Haardt et al. |
| 5,306,266 A | 4/1994 | Freeland |
| 5,345,814 A | 9/1994 | Cur et al. |
| 5,366,674 A | 11/1994 | Hattori et al. |
| 5,505,810 A | 4/1996 | Kirby et al. |
| 5,532,034 A | 7/1996 | Kirby et al. |
| 5,665,285 A | 9/1997 | Hattori et al. |
| 5,711,073 A | 1/1998 | Tippmann et al. |
| 5,713,518 A | 2/1998 | Fox et al. |
| 5,759,459 A | 6/1998 | Eckardt et al. |
| 5,786,394 A * | 7/1998 | Slaven ............... 521/51 |
| 5,824,261 A | 10/1998 | Berdan |
| 5,866,224 A | 2/1999 | Ang et al. |
| 5,956,905 A | 9/1999 | Weidrich |
| 6,179,215 B1 | 1/2001 | Shea |
| 6,196,760 B1 | 3/2001 | Sinclair |
| 6,230,981 B1 | 5/2001 | Hill et al. |
| 6,241,926 B1 * | 6/2001 | Cutler ............... 264/113 |
| 6,375,892 B2 | 4/2002 | Thomas |
| 6,605,343 B1 | 8/2003 | Motoi et al. |
| 6,685,333 B1 | 2/2004 | Bieberdorf |
| 6,692,183 B2 | 2/2004 | Godfrey |
| 6,931,809 B1 | 8/2005 | Brown et al. |
| 6,938,968 B2 | 9/2005 | Tanimoto et al. |
| 6,972,144 B2 | 12/2005 | Roth et al. |
| 7,219,479 B2 | 5/2007 | Durning et al. |
| 7,358,280 B2 | 4/2008 | Berghmans et al. |
| 7,401,998 B2 | 7/2008 | Wilson et al. |
| 7,485,352 B2 | 2/2009 | Yuasa et al. |
| 7,537,413 B1 | 5/2009 | Brugos |
| 7,931,210 B1 | 4/2011 | Pike et al. |
| 7,950,592 B2 | 5/2011 | Yuan |
| 7,976,749 B2 * | 7/2011 | Volkel et al. ............... 264/45.6 |
| 2002/0124531 A1 | 9/2002 | Mossbeck et al. |
| 2003/0081999 A1 | 5/2003 | Godfrey |
| 2003/0181536 A1 | 9/2003 | Roth |
| 2003/0224675 A1 | 12/2003 | Yeh |
| 2004/0172964 A1 | 9/2004 | Brachert et al. |
| 2004/0176001 A1 | 9/2004 | Yeh |
| 2004/0232254 A1 | 11/2004 | Kowalski |
| 2005/0001048 A1 | 1/2005 | Skoblenick et al. |
| 2005/0101201 A1 | 5/2005 | Yeh |
| 2005/0188637 A1 | 9/2005 | Yeh |
| 2005/0215138 A1 | 9/2005 | Yeh |
| 2005/0272323 A1 | 12/2005 | Yeh |
| 2006/0030467 A1 | 2/2006 | Mellott |
| 2006/0078382 A1 | 4/2006 | Wilson et al. |
| 2006/0105650 A1 | 5/2006 | Yeh |
| 2006/0110993 A1 | 5/2006 | Yeh |
| 2006/0131437 A1 | 6/2006 | Thiagarajan et al. |
| 2006/0134401 A1 | 6/2006 | Yeh |
| 2006/0223897 A1 | 10/2006 | Sasaki |
| 2007/0015421 A1 | 1/2007 | Yeh |
| 2007/0040293 A1 | 2/2007 | Lane et al. |
| 2007/0160798 A1 | 7/2007 | Yeh |
| 2008/0081153 A1 | 4/2008 | Yeh |
| 2008/0083835 A1 | 4/2008 | Girardi et al. |
| 2008/0125502 A1 | 5/2008 | Reichman et al. |
| 2008/0142611 A1 | 6/2008 | Scobie |
| 2008/0166539 A1 | 7/2008 | Yeh |
| 2008/0242169 A1 | 10/2008 | Yeh |
| 2008/0305304 A1 | 12/2008 | Yeh |
| 2009/0100780 A1 | 4/2009 | Mathis et al. |
| 2010/0028654 A1 | 2/2010 | Takase et al. |
| 2010/0116180 A1 | 5/2010 | Roth et al. |
| 2012/0031912 A1 | 2/2012 | Wang |
| 2012/0102884 A1 | 5/2012 | Roberts, Jr. |
| 2012/0104110 A1 | 5/2012 | Roberts, Jr. |
| 2012/0328889 A1 | 12/2012 | Hayashi et al. |

FOREIGN PATENT DOCUMENTS

| | | |
|---|---|---|
| JP | 59155443 | 9/1984 |
| JP | 59210954 | 11/1984 |
| JP | 60090744 | 5/1985 |
| JP | 06166112 | 6/1994 |
| JP | 07195536 | 8/1995 |
| WO | 9119867 | 12/1991 |
| WO | 2011103284 | 8/2011 |

OTHER PUBLICATIONS

Website, Manning, www.mmh.com Oct. 2008, Retrived on Jan. 4, 2011, "Modern Materials Handling, Choosing Plastic." 2 Pages.

Website, Specter, www.mmh.com Sep. 2009, "Modern Materials Handling, The Rise of the Plastic Pallet." 4 Pages.

* cited by examiner

IN-SITU FOAM CORE STRUCTURAL ENERGY MANAGEMENT SYSTEM AND METHOD OF MANUFACTURE

CROSS-REFERENCE TO RELATED APPLICATIONS

This application claims the benefit of U.S. Provisional Application No. 61/616,948 filed Mar. 28, 2012, the disclosure of which is incorporated in its entirety by reference herein.

TECHNICAL FIELD

The disclosed embodiments relate to an in-situ foam core structural bumper system and method of manufacturing of same.

BACKGROUND

Energy management of relatively high input conditions is crucial. For example, vehicle manufacturers attempt to reduce the weight of the vehicles in order to enhance the fuel economy of the vehicles. Often, the reduction in weight compromises component part strength. For example, bumper systems have a relatively long span that is unsupported across the front of the vehicle between vehicle frame members. Traditionally, vehicle manufacturers have used a steel beam to provide the structural support. At the same time, bumper systems must minimize damage over that long span in a 5 mph crash test. Meeting that requirement often means that desired weight reductions are not possible. Recently, vehicle manufacturers have applied energy absorbing materials and product configurations to the steel beam to allow reduction in the thickness of the steel. However steel beams are still relatively heavy even when this steel has been thinned to the minimum necessary.

SUMMARY

In at least one embodiment, an energy management system for use with a vehicle having an interior includes an elongated plastic member having a wall defining a cavity. Disposed within the cavity is an elongated first in-situ foam core member, which has a first thermal bond to the wall. The wall having a first portion facing towards the vehicle interior and a second portion opposed to the first portion. A second in-situ foam core member is connected to at least a portion of the elongated plastic member forming the energy management system. The energy management system is capable of passing a 5-mph crash test passing Federal Motor Vehicle Safety Standard 215 (FMVSS 215) Phase II.

In another embodiment, an energy management system for use with a vehicle includes an elongated plastic member having a wall defining a cavity and a first in-situ foam core member disposed within the cavity. The first in-situ foam core has a first thermal bond to the wall. The thermal bond includes a cooled connection of a molten or a softened portion the wall, a molten or a softened portion of the first in-situ foam core, and a layer including portions of the wall and the first in-situ foam core. A second in-situ foam core member is connected to at least a portion of the elongated plastic member by a second thermal bond disposed between the wall and the second in-situ foam core. The energy management system is capable of meeting the requirements of 49 CFR Part 581.5 when measured according to 49 CFR Part 581.6 and 581.7.

In another embodiment, a method of manufacture of an energy management system includes the steps of spacing a first mold portion and a second mold portion about a polymeric parison, where the first mold portion has a port. The method includes pinching the polymer parison when closing the first and second mold portions about the polymer parison. Air is injected into the pinched parison forming a wall and a cavity from the polymer parison. An aperture is drilled into the wall through the port. A first plurality of beads is dispensed into the cavity through the aperture. Steam is injected into the first plurality of beads causing expansion of the first plurality of beads to form a first in-situ foam core having a thermal bond to the wall, thereby forming a structural plastic beam. The first mold portion is separated from the structural plastic beam. A second plurality of beads is dispensed between the first mold portion and the structural plastic beam. The first mold portion is closed again. Steam is injected into the second plurality of beads causing expansion of the second plurality of beads to form a second in-situ foam core having a second thermal bond to the structural plastic beam forming an the energy management system.

DETAILED DESCRIPTION

Figure 1:
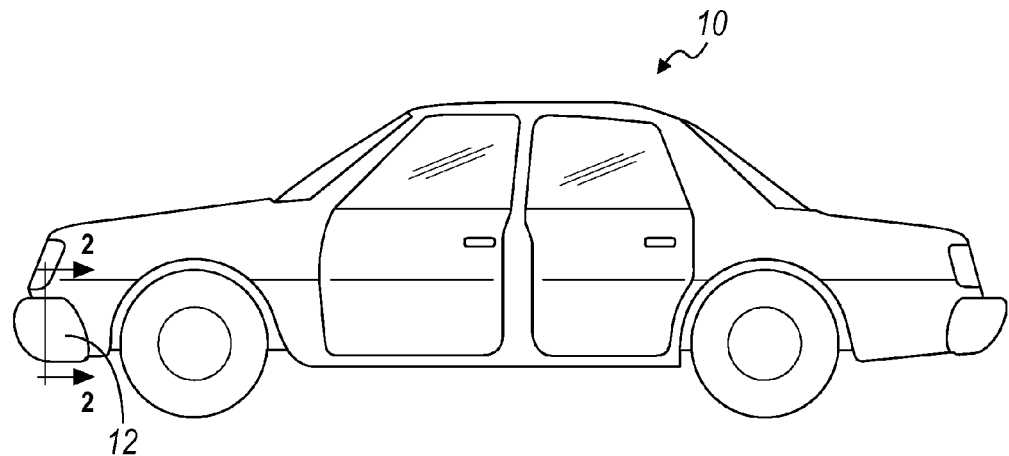
FIG. 1 schematically illustrates a vehicle having a structural bumper system according to at least one embodiment.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Except where expressly indicated, all numerical quantities in the description and claims, indicated amounts of material or conditions of reaction and/or use are to be understood as modified by the word "about" in describing the broadest scope of the present invention. Practice within the numerical limits stated should be desired and independently embodied. Ranges of numerical limits may be independently selected from data provided in the tables and description. The description of the group or class of materials as suitable for the purpose in connection with the present invention implies that the mixtures of any two or more of the members of the group or classes are suitable. The description of constituents in chemical terms refers to the constituents at the time of addition to any combination specified in the description and does not necessarily preclude chemical interaction among constituents of the mixture once mixed. The first definition of an acronym or other abbreviation applies to all subsequent uses herein of the same abbreviation and applies mutatis mutandis to normal grammatical variations of the initially defined abbreviation. Unless expressly stated to the contrary, measurement of a property is determined by the same techniques previously or later referenced for the same property. Also, unless expressly stated to the contrary, percentage, "parts of," and ratio values are by weight, and the term "polymer" includes "oligomer," "co-polymer," "terpolymer," "pre-polymer," and the like.

It is also to be understood that the invention is not limited to specific embodiments and methods described below, as specific composite components and/or conditions to make, of course, vary. Furthermore, the terminology used herein is used only for the purpose of describing particular embodiments of the present invention and is not intended to be limiting in any way.

It must also be noted that, as used in the specification and the pending claims, the singular form "a," "an," and "the," comprise plural reference unless the context clearly indicates otherwise. For example, the reference to a component in the singular is intended to comprise a plurality of components.

Throughout this application, where publications are referenced, the disclosure of these publications in their entirety are hereby incorporated by reference into this application to more fully describe the state-of-art to which the invention pertains.

FIG. 1 schematically illustrates a vehicle 10 has an energy management system including a structural bumper system 12 for front and rear bumpers according to at least one embodiment.

Figure 2:
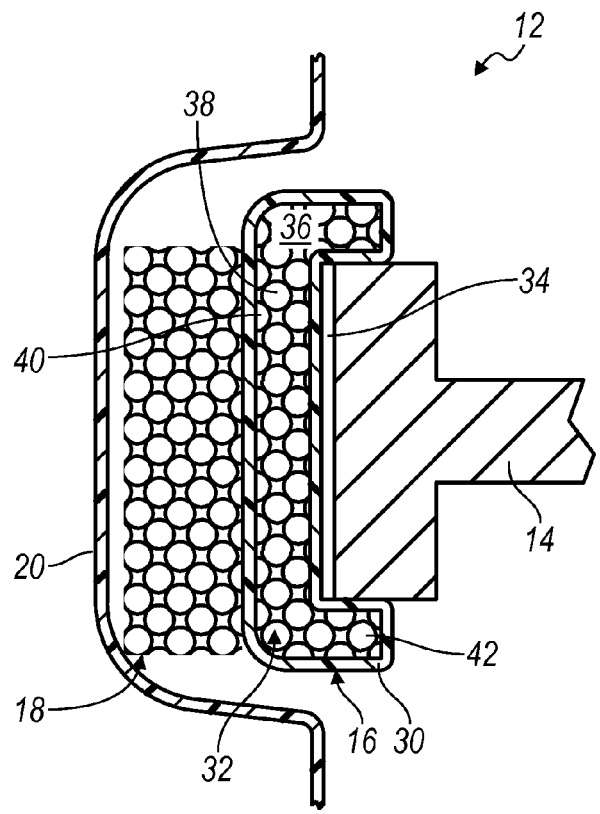
FIG. 2 schematically illustrates a fragmentary cross-sectional view of a structural bumper system along axis 2-2 of FIG. 1 according to at least one embodiment.

FIG. 2 schematically illustrates a fragmentary cross-sectional view of structural bumper system 12 along axis 2-2 of FIG. 1 according to at least one embodiment. Structural bumper system 12 includes a vehicle frame member 14, a structural plastic beam 16, an energy absorbing component 18, and a bumper fascia 20.

Structural plastic beam 16 includes a wall 30 having a thermal bond to an in-situ foam core 32. In at least one embodiment, the thermal bond includes the cooled connection of a molten or softened portion of wall 30, a molten or softened portion of in-situ foam core 32, and a co-mingled layer including portions of both wall 30 and core 32. Structural plastic beam 16 is connected to a vehicle frame member 14 with an adhesive layer 34 comprising an adhesive. It should be understood that any fastening method known in the art is suitable for connecting structural plastic beam 16 to vehicle frame member 14 without exceeding the scope or the spirit of the embodiments. Secured to structural plastic beam 16 is energy absorbing component 18. It should be understood that energy absorbing component 18 may be directly connected to structural plastic beam 16 or indirectly connected with optional layers of material and/or separation space being present. Connected to and/or spaced apart from energy absorbing component 18 is bumper fascia 20.

In at least one embodiment, the energy management system for vehicle 10 is capable of passing a 5-mph crash test according to a Federal Motor Vehicle Safety Standard 215 (FMVSS 215) Phase II specification. In another embodiment, the energy management system for vehicle 10 is capable of meeting the requirements of 49 CFR Part 581.5 when measured according to 49 CFR Part 581.6 and 581.7.

In-situ foam core 32 is prepared by injecting steam into pre-expanded beads dispensed into cavity 36 defined by wall 30. In at least one embodiment, at least two diameters of pre-expanded beads are dispensed into cavity 36 forming two zones 38 and 40 having different average densities of fully expanded beads 42 to comprise in-situ foam core 32. First zone 38 has relatively larger diameter beads of fully expanded beads than second zone 40. Therefore, the first zone 38 has a relatively lower average density than second zone 40. It is understood that while first zone 38 is illustrated as being disposed about structural plastic beam 16 neutral axis, first zone 38 may be disposed at any position within cavity 36. It is further understood that while two zones of different average densities are illustrated, there may be a plurality of zones of different densities without exceeding the scope or spirit of embodiments. It is yet further understood that the zones may be established in a relatively arbitrary manner such as delimiting zones along a gradient of average densities within the article.

The steps of expanding the pre-expanded beads to fully expanded beads 42 are illustrated by U.S. patent application Ser. Nos. 13/358,181, 13/005,190, and 12/913,132 all of which are incorporated herein by reference.

In at least one embodiment, wall 30 thickness may range from 0.03 inches to 0.5 inches. In another embodiment, wall 30 thickness may range from 0.05 inches to 0.25 inches.

In at least one embodiment, in-situ foam core 32 thickness may range from 0.15 inches to 6 inches. In another embodiment, in-situ foam core 32 thickness may range from 0.2 inches to 4 inches. In another embodiment, in-situ foam core 32 thickness may range from 0.5 inches to 1 inch.

In at least one embodiment, the energy management system has weight and weighs less than 50 lbs. In another embodiment, the energy management system weight ranges from 10 to 40 lbs. In yet another embodiment, the energy management system weight ranges from 15 to 30 lbs.

Wall 30, in at least one embodiment, is formed of a composition of any moldable composition. Non-limiting examples of the composition include, but are not limited to, a liquid silicone rubber, a synthetic rubber, a natural rubber, a liquid crystal polymer, a synthetic polymer resin, and a natural polymer resin. In another embodiment, first and/or second layer 22 and 24, respectively, are formed of a composition of a thermoplastic polymer, a thermoset polymer, or blends thereof having a viscosity ranging from 0.1 grams/10 min to 40 grams/10 min. The viscosity is measured according to ASTM D-1238 at 190° C. with a 2.16 kg weight. In yet another embodiment, first and/or second layer 22 and 24, respectively, are formed of a composition of a polyolefin including polypropylene and polyethylene having a viscosity ranging from 1 grams/10 min to 30 grams/10 min.

In-situ foam core 32, in at least one embodiment, is formed of a composition of any fluid-expandable material. Examples of fluid-expandable material include, but are not limited to, a polyolefin polymer composition, a biopolymer expandable bead, an alkenyl aromatic polymer or copolymer, a vinyl aromatic polymer resin composition, and a polystyrene polymer composition. In at least one embodiment, the polyolefin polymer composition includes polyolefin homopolymers, such as low-density, medium-density, and high-density polyethylenes, isotactic polypropylene, and polybutylene-1, and copolymers of ethylene or polypropylene with other: polymerized bull monomers such as ethylene-propylene copolymer, and ethylene-vinyl acetate copolymer, and ethylene-acrylic acid copolymer, and ethylene-ethyl acrylate copolymer, and ethylene-vinyl chloride copolymer. These polyolefin resins may be used alone or in combination. Preferably, expanded polyethylene (EPE) particles, cross-linked expanded polyethylene (xEPE) particles, polyphenyloxide (PPO) particles, biomaterial particles, such as polylactic acid (PLA), and polystyrene particles are used. In at least one embodiment, the polyolefin polymer is a homopolymer providing increased strength relative to a copolymer. It is also understood that some of the particles may be unexpanded, also known as pre-puff, partially and/or wholly pre-expanded without exceeding the scope or spirit of the contemplated embodiments.

Pre-expanded beads, in at least one embodiment, are the resultant beads after raw beads have undergone a first expansion step of a two-step expansion process for beads. During the first expansion step, raw bead is expanded to 2% to 95% of the fully expanded bead size. The fully expanded bead is the bead that forms in-situ foam core 26. In another embodiment, pre-expanded bead is result of the first expansion step where raw beads are expanded from 25% to 90% of the fully-expanded beads 42 size. It is understood that pre-expanded beads may be partially recompressed during introduction to cavity 36, if the introduction process occurs under pressure. In at least one embodiment, introduction process pressure ranges from 5 lbf/in$^2$ above ambient to 50 lbf/in$^2$ above ambient. In at least one embodiment, introduction process pressure ranges from 15 lbf/in$^2$ above ambient to 35 lbf/in$^2$ above ambient.

A fluid for the second expansion step of the two-step expansion process for beads causes the pre-expanded beads to expand completely to form the fully expanded beads. Examples of the fluid include, but are not limited to, steam and superheated steam.

Polyolefin beads and methods of manufacture of pre-expanded polyolefin beads suitable for making the illustrated embodiments are described in Japanese patents JP60090744, JP59210954, JP59155443, JP58213028, and U.S. Pat. No. 4,840,973 all of which are incorporated herein by reference. Non-limiting examples of expanded polyolefins are ARPLANK® and ARPRO® available from JSP, Inc. (Madison Heights, Mich.). The expanded polypropylene, such as the JSP ARPRO™ EPP, has no external wall such as energy absorbing component 18.

In at least one embodiment, in-situ foam core 32 density, after expansion by steam such a such as in FIG. 2, ranges from 1 lb/ft$^3$ to 25 lbs/ft$^3$. In at least one embodiment, in-situ foam core 32 density, after expansion by steam such as in FIG. 1, ranges from 1.5 lbs/ft$^3$ to 15 lbs/ft$^3$. In at least one embodiment, in-situ foam core 32 density, after expansion by steam such as in FIG. 2, ranges from 2 lbs/ft$^3$ to 9 lbs/ft$^3$. In at least one embodiment, in-situ foam core 32 density, after expansion by steam such as in FIG. 1, ranges from 3 lbs/ft$^3$ to 6 lbs/ft$^3$.

Preferably, in at least one embodiment, structural plastic beam 16 is comprised of steam-injected expanded polypropylene (EPP) has a density ranging from 1 lb/ft$^3$ to 20 lbs/ft$^3$. In yet another embodiment, steam-injected EPP may have a density ranging from 1.5 lbs/ft$^3$ to 10 lbs/ft$^3$. In yet another embodiment, steam-injected EPP may have a density ranging from 2 lbs/ft$^3$ to 6 lbs/ft$^3$. In yet another embodiment, steam-injected EPP may have a density ranging from 3 lbs/ft$^3$ to 5 lbs/ft$^3$. In at least one embodiment, structural plastic beam 16 and structural bumper system 12 pass the 5-mph crash test and are recyclable.

In at least one embodiment, wall 30 with a range of 0.025 inch thickness to 0.1 inch thickness is comprised of a metallocene polypropylene. Such a combination is found to improve adhesion between wall 30 and in-situ foam core 32 formed of EPP.

Turning now to FIG. 3, a method of manufacture of a structural bumper system according to at least one embodiment is schematically illustrated in fragmentary cross-sectional views. In FIG. 3A a first mold portion 80 and a second mold portion 82 are spaced about a polymeric parison 84 as part of a blowmolding process. First mold portion 80 has a port 86 suitable for use with injection devices.

Figure 3A:
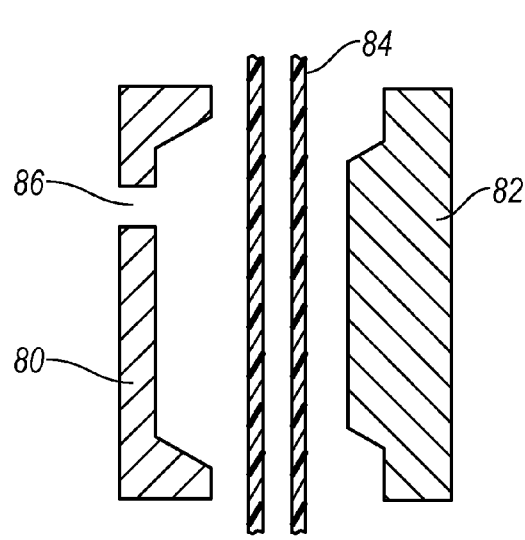
FIGS. 3A-G schematically illustrate fragmentary cross-sectional views of a method of manufacture of a structural bumper system according to at least one embodiment.
Figure 3B:
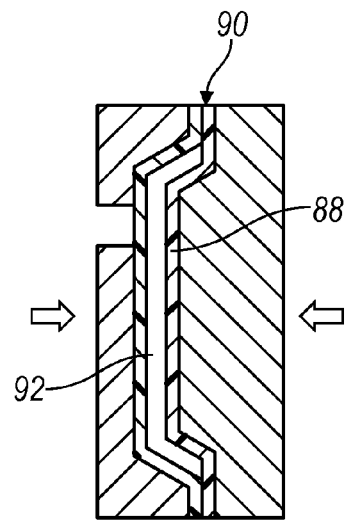

FIG. 3B schematically illustrates closing of first mold portion 80 with second mold portion 82 pinching polymeric parison 84 between them. Polymeric parison 84 forms walls 88 of an energy management component 90 and defining a cavity 92.

Figure 3C:
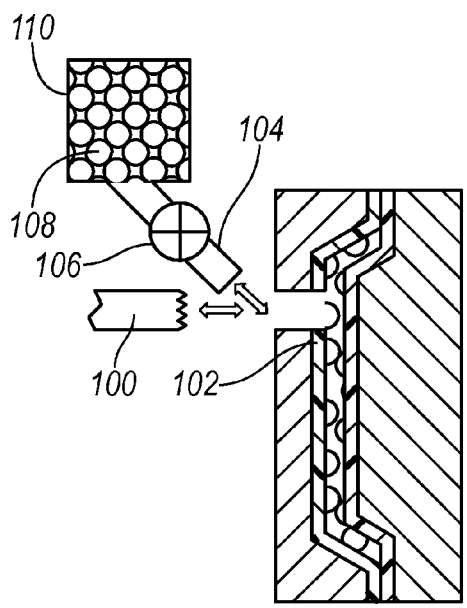
Figure 3D:
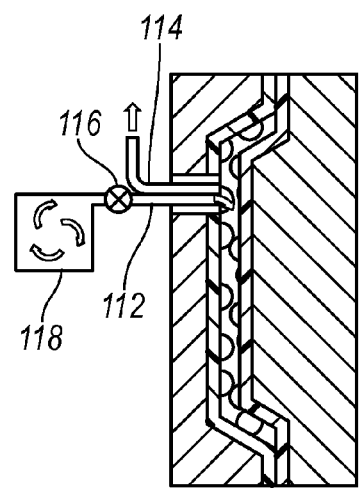

In FIG. 3C, a drill bit 100 enters port 86 and drills through a portion of wall 88 opening an aperture 102 into cavity 92. Drill bit 100 withdraws from port 86 and a bead dispenser 104 enters port 86. A valve 106 opens allowing a plurality of pre-expanded beads 108 from a bead source 110 to enter cavity 92. Bead dispenser 104 withdraws from port 86 and steam pin 112 and steam vent 114 enter port 86 in FIG. 3D. Steam pin 112 further enters cavity 92 and into pre-expanded beads 108. A valve 116 of a steam source 118 opens allowing steam and/or superheated steam to enter cavity 92 causing expansion of pre-expanded beads 108 forming fully expanded beads. Residual steam exits through steam vent 114.

Figure 3E:
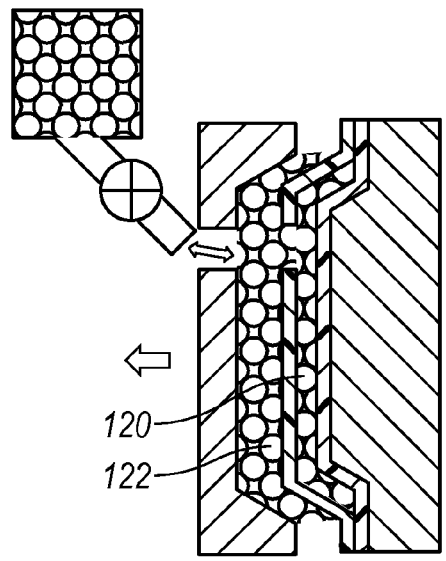

In FIG. 3E, fully expanded beads form an in-situ foamed core 120 which is bonded thermally to walls 88. First mold portion 80 moves away from second mold portion 82 and wall 88 forming a gap 122. Bead dispenser 104 enters port 86. A valve 106 opens dispensing pre-expanded beads 108 into gap 122. Bead dispenser 104 withdraws from port 86.

Figure 3F:
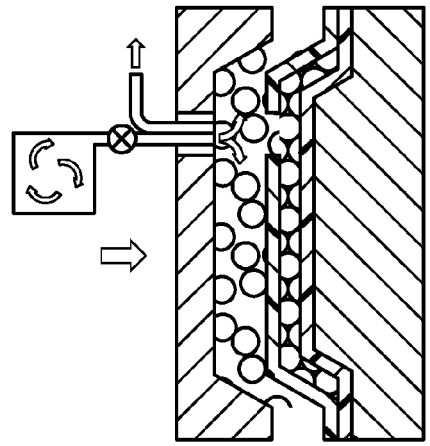
Figure 3G:
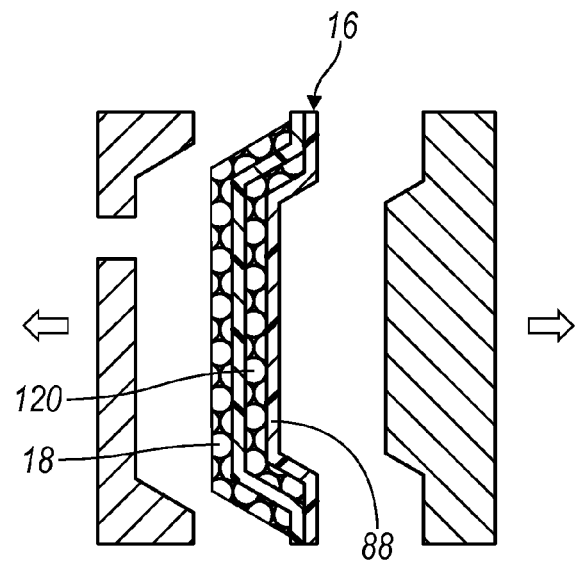

In FIG. 3F, first mold portion 80 closes, thereby compacting pre-expanded beads 108 in gap 122. Steam pin 112 and steam vent 114 enter port 86 and inject steam into compressed pre-expanded beads 108 in gap 122 causing expansion of pre-expanded beads 108 in 122 forming fully expanded beads. The full expanded beads comprise an energy absorbing component 18 thermally bonded to wall 88 of structural plastic beam 16 where wall 88 encompasses in-situ foamed core 120.

It should be understood that while a single bead source 110 is illustrated in steps 3C and 3E, a plurality of bead sources could be used, with each bead source having identical or different diameter beads of identical or different composition. It is also understood that while a single steam source 118 is illustrated in steps 3D and 3F, a plurality of steam sources may be used with each steam source having identical or different compositions of fluids, such as steam and superheated steam.

Figure 4:
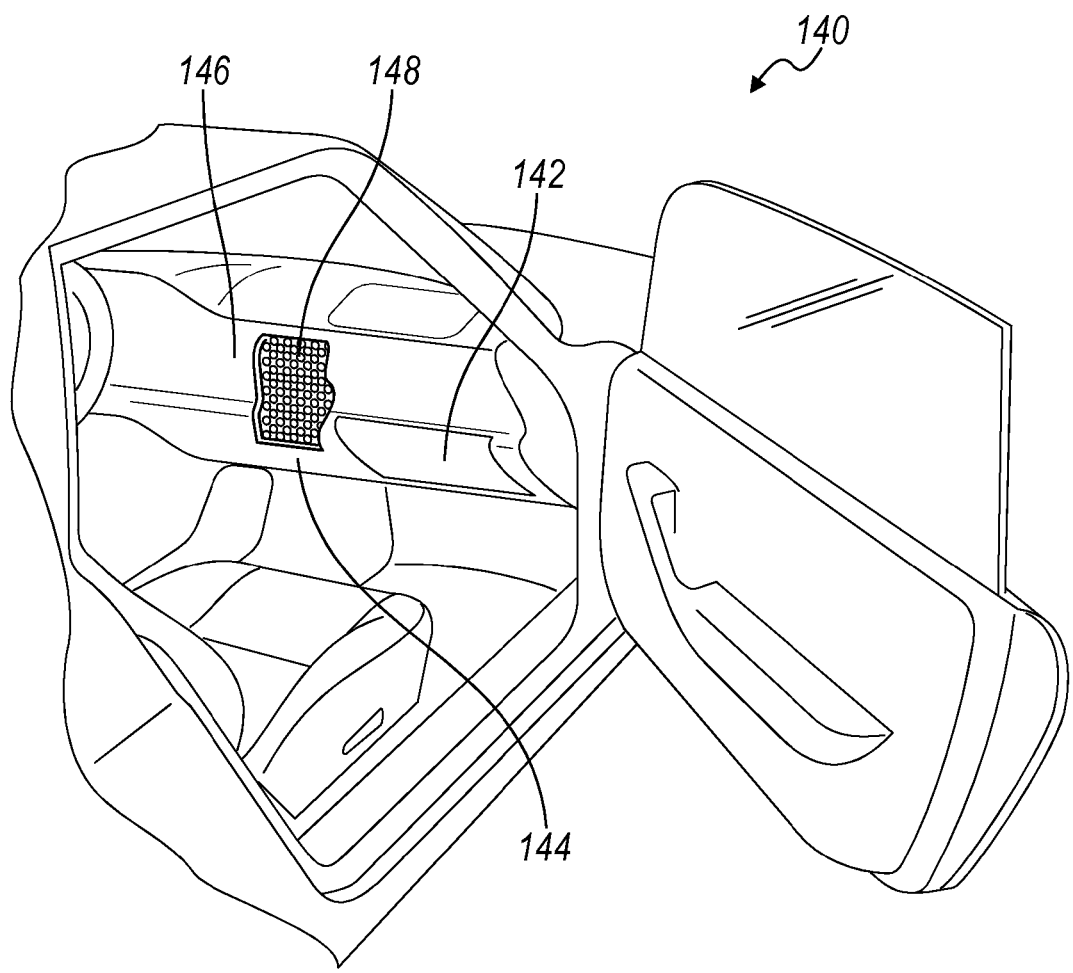
FIG. 4 schematically illustrates energy management components according to at least one embodiment.

Turning now to FIG. 4 a vehicle 140 is illustrated schematically according to at least one embodiment. A glovebox 142 and a knee bolster 144 include a scheme 146 thermally bonded to an in-situ foam core 148. The density of in-in situ foamed core 148 assists in energy management of an impact with the area of the dashboard containing glovebox 142 and knee bolster 144.

While exemplary embodiments are described above, it is not intended that these embodiments describe all possible forms of the invention. Rather, the words used in the specification awards a description rather than limitation, and it is understood that various changes may be made without departing from the scope and spirit of the invention. Additionally, features of the various implementing embodiments may be combined to form further embodiments of the invention.

I claim:

1. A method of manufacture of an energy management system, the method comprising the steps of:
   providing a mold comprising a first mold portion and a second mold portion;
   spacing the first mold portion and the second mold portion about a polymeric parison;
   closing the first and second mold portions to pinch the polymer parison;
   injecting air into the parison forming a wall and a cavity from the polymer parison;

drilling an aperture in the wall through a port in the first mold portion;

dispensing a first plurality of beads into the cavity through the aperture;

injecting steam into the first plurality of beads causing expansion of the first plurality of beads to form a first in-situ foam core having a thermal bond to the wall forming a structural plastic beam;

separating the first mold portion from the structural plastic beam to create a space between the first mold portion and the structural plastic beam;

dispensing a second plurality of beads into the space between the first mold portion and the structural plastic beam;

injecting steam into the second plurality of beads causing expansion of the second plurality of beads to form a second in-situ foam core having a second thermal bond to the structural plastic beam forming the energy management system; and opening the mold to remove the energy management system, wherein the step of separating the first mold portion from the structural plastic beam to create the space between the first mold portion and the structural plastic beam consists of moving the first mold portion away from the second mold portion and the wall.

2. The method of claim 1, wherein the first or second plurality of beads is a plurality of pre-expanded beads.

3. The method of claim 1, wherein the first or second plurality of bead compositions include at least one of a polyolefin composition, an alkenyl aromatic polymer composition, a polystyrene composition, a polyvinyl chloride composition, or a biopolymer composition.

4. The method of claim 1, wherein the energy management system member forms an elongated bumper beam which is capable of passing a 5-mph crash test passing Federal Motor Vehicle Safety Standard 215 (FMVSS 215) Phase II.

5. The method of claim 1, wherein the energy management system member forms an elongated bumper beam having a weight which ranges from 10 to 40 lbs.

6. The method of claim 1 wherein the steps of injecting steam are done by introducing steam into the beads through the aperture.

* * * * *